Oct. 3, 1933.   J. H. SAMPSON   1,929,153
GEAR SHIFT CONTROL
Filed Aug. 3, 1931   2 Sheets-Sheet 1
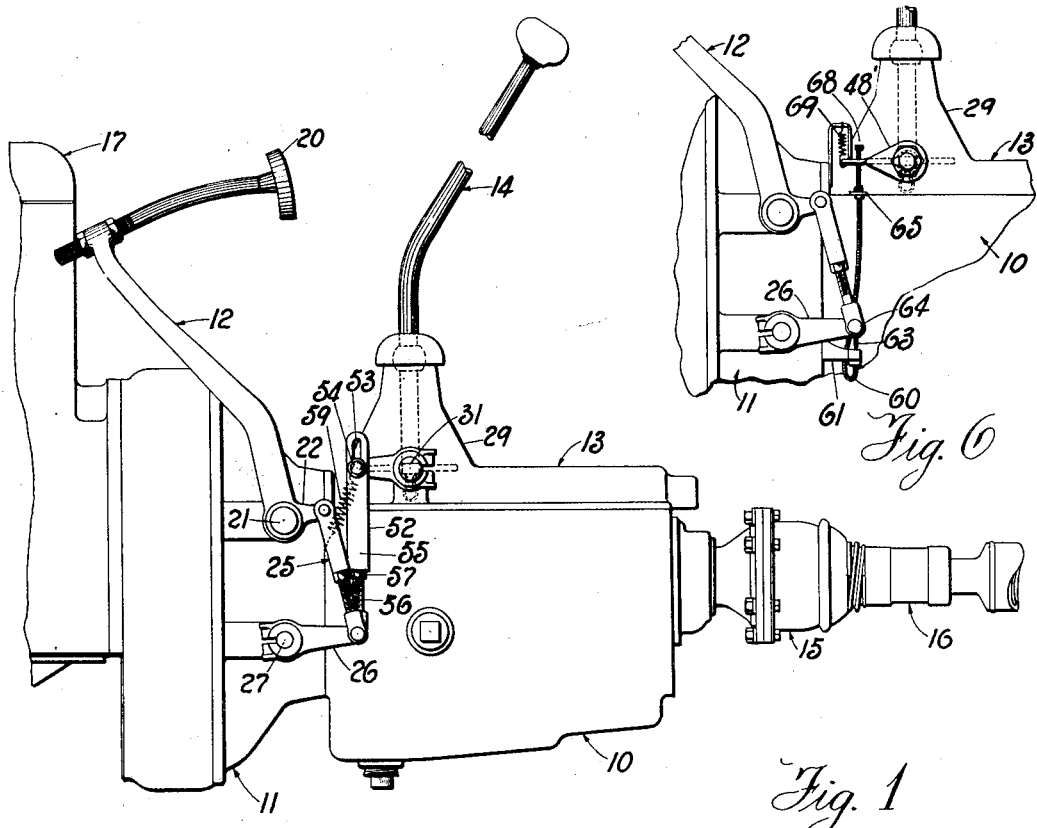
Fig. 6
Fig. 1
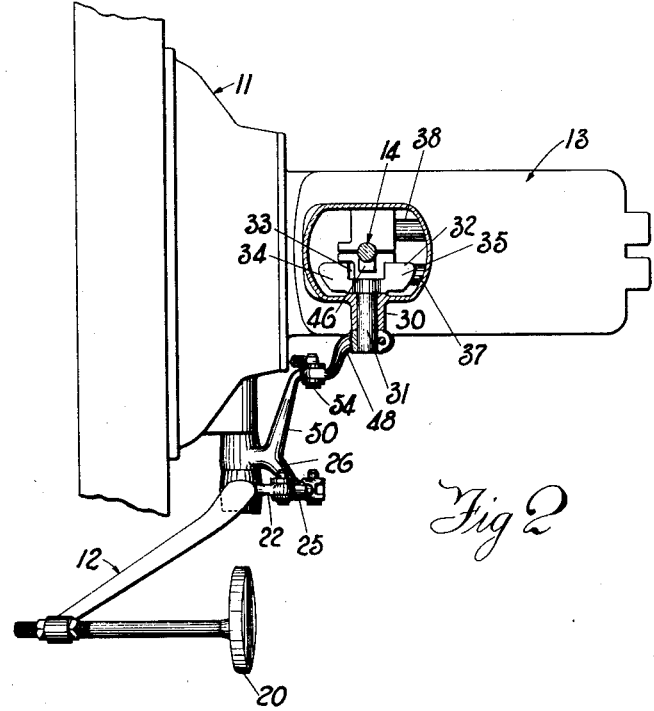
Fig. 2
INVENTOR.
John H. Sampson
BY P. W. Pomeroy
ATTORNEYS.

Oct. 3, 1933.  J. H. SAMPSON  1,929,153
GEAR SHIFT CONTROL
Filed Aug. 3, 1931  2 Sheets-Sheet 2
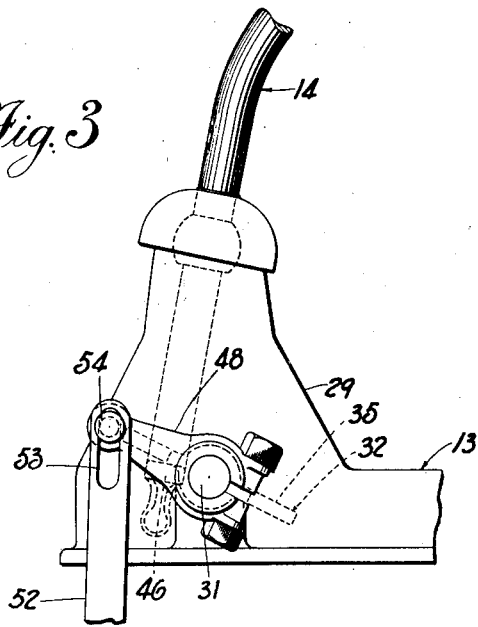
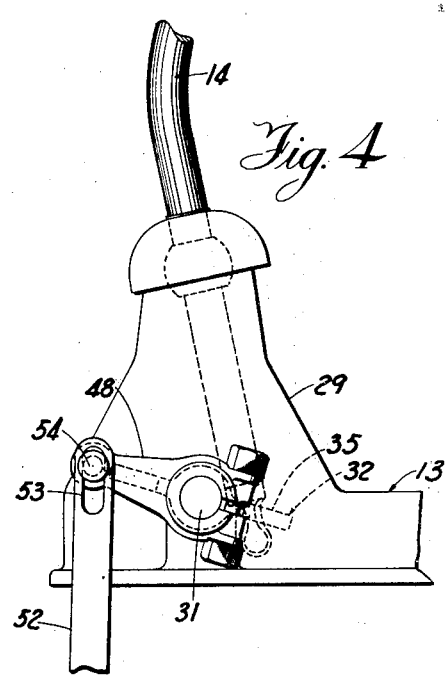
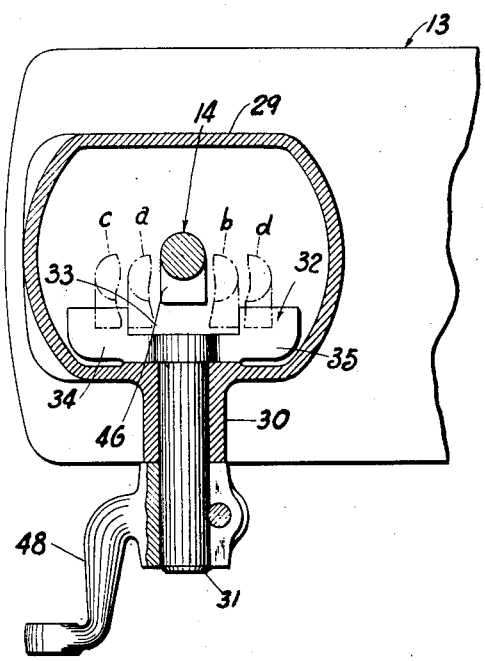
INVENTOR.
John H. Sampson
BY
ATTORNEYS.

Patented Oct. 3, 1933

1,929,153

UNITED STATES PATENT OFFICE 1,929,153

GEAR SHIFT CONTROL

John H. Sampson, Chicago, Ill., assignor, by mesne assignments, to Free Wheeling Patents Corporation, South Bend, Ind., a corporation of Delaware Application August 3, 1931. Serial No. 554,738

10 Claims. (Cl. 74—39)

This invention relates to a gear shift control, particularly to the control of a gear shift used in combination with a transmission provided with free-wheeling and positive drives, such as a free wheeling transmission now in use on certain makes of automobiles as illustrated, for example, in White and Fishburn application, Serial 474,366, filed August 11, 1930. In such a transmission the gear shift is provided with a releasable stop which defines the positions of the primary shift which in such transmissions is generally the free wheeling position of the transmission and is releasable to provide for an over-shift into the positive drive position of the transmission. However, this invention relates only to the control of the releasable stop member, the details of the transmission structure not having been shown. It is a particular object of this invention to provide a control for such an over-shift transmission in which the control element is operably connected with the clutch pedal of the vehicle so that over-shifting of the gear shift may be accomplished only upon depression of the vehicle clutch.

It is a further object to provide a device of this character which is simple and rugged in construction and is economical to manufacture, easy to install and which will not readily get out of order.

It is also an object of this invention to provide a structure of the character described that is fully adjustable and will accomplish its desired function without having any disadvantageous affect on the operation of the clutch pedal.

Other objects and advantages will appear as the description proceeds.

The drawings forming a part of this application illustrate two mechanical embodiments of the idea of the invention. The structure disclosed therein, however is to be taken as illustrative only and the scope of the invention is to be limited entirely by the subjoined claims.

In the drawings:

Figure 1 is a vertical elevational view of a vehicle transmission and clutch showing certain elements of the invention applied thereto, certain other parts of the vehicle being illustrated to more clearly show the exact operation of the device.

Figure 2 is a horizontal plan view of a vehicle transmission, clutch and clutch pedal, a portion of the transmission cover being broken away to better illustrate the construction of the device of the invention.

Figure 3 is an elevational view of a fragmentary portion of a vehicle transmission cover and gear shift lever, showing the device of the invention tilted to permit over-shift of the gear shift lever in one direction.

Figure 4 is a view similar to Figure 3 but showing the gear shift lever in the position of over-shift opposite to that illustrated in Figure 3.

Figure 5 is a plan view of a fragmentary portion of the transmission cover, a portion of the cover being broken away to better illustrate the construction and operation of the device. The operation of the device being also shown in a schematic manner.

Figure 6 is an elevational view showing a modified form of the device in which a Bowden cable connection is substituted for the mechanical linkage shown in Figures 1 and 2.

Referring to Figure 1, 10 generally indicates the vehicle transmission; 11 generally indicates the conventional clutch; 12 the clutch pedal; 13 the transmission cover; 14 the transmission gear shift lever; 15 the front universal joint in the propeller shaft 16, and 17 generally indicates the motor block to which the clutch 11 is rigidly connected. The clutch pedal 12 is provided with a foot treadle 20 and is pivotally mounted upon a shaft 21 rigidly secured to the casing of the clutch 11. The pivotally mounted end of the clutch pedal 12 is provided with an offset or bell crank lever portion 22 to which is pivotally connected an adjustable link generally indicated at 25. This link is connected at its opposite end to a lever member 26 which is rigidly mounted on the end of the clutch actuating shaft 27. The transmission cover 13 is provided with an upstanding portion 29 in which the gear shift lever 14 is mounted in the usual manner. As this structure is all old and well known in the art, it is believed that a further description thereof is unnecessary for the purpose of this disclosure.

The device of the invention comprises the following elements in the relation as hereinafter set forth.

Referring to Figure 2, it will be seen that the upstanding portion 29 of the transmission cover 13 is provided with a boss 30 which forms a bearing for a shaft 31 which projects into the portion 29 of the transmission cover 13. Upon the inner end of the shaft 31 there is rigidly mounted a stop member 32 in the form of an elongated bar provided with a notch 33 in the central portion thereof and shoulders 34 and 35 upon the ends thereof. This bar 32 is rotatable by means of the shaft 31. The transmission is provided with shifter bars 37 and 38 with which the lower end of the gear shift lever 14 is selectively engageable to actuate certain well known elements of the transmission to provide for variable speed ratios between the motor 17 and the propeller shaft 16. The shift lever 14 is provided at its lower end with a lug 46 adapted to extend into the notch 33 in the member 32 when the member 32 is in its normal or horizontal position. The lug 46 is shorter than the notch 33 by an amount sufficient to permit the primary shifts of the bar 37 before engagement of the lug 46 with the shoulders 34 and 35. The engagement of the lug with these shoulders acts to effectively prevent over-shift of the bar 37.

Rigidly secured upon the outer end of the shaft 31 is a lever member 48 by means of which the shaft 31 and the stop member 35 are rotated in the following manner:

Integrally formed with the lever member 26 is a second lever member 50 which extends inwardly toward the transmission 10 and terminates with its free end directly below the free end of the lever 48. The ends of the levers 48 and 50 are connected by an adjustable link member 52 illustrated in Figure 1. This link member 52 is provided in its upper end with a slot 53 adapted to receive a pin 54 extending through the end of the lever 48. The lower end of the link 52 is pivotally secured to the lever 50 by means of a similar pin, not illustrated. From an inspection of Figure 1, it will be seen that the link 52 comprises a tubular portion 55 into which is inserted a screw threaded portion 56, the portions 55 and 56 being secured in their adjusted positions by means of a lock nut 57. A spring 59 is provided to return the lever 48 to its normal position.

From the structure just described, it will be observed that a depression of the clutch pedal 12 will serve to rotate the member 31 through a small angle to tilt the stop member 32. Referring to Figures 3 and 4 it will be observed that whenever the stop member 32 is tilted by a depression of the clutch pedal 12, the lug 46 is released from the shoulders 34 and 35 and an over-shift of the shifter bar 37 may be accomplished in either direction. This function is particularly illustrated in Figure 5, in which the positions "a" and "b" of the gear shift lever illustrate the position of primary shift in which the lug 46 is stopped by the shoulders 34 and 35, and the positions "c" and "d" illustrate the position of over-shift, which may be accomplished when the stop member 32 is tilted to such an extent that the shoulders 34 and 35 no longer engage the lug 46.

In the modified form of the invention illustrated in Figure 6, I employ a Bowden cable 60 as a connection between the clutch pedal 12 and the lever 48'. In this application one end of the casing of the Bowden cable is fixed in a bracket 61 secured to the clutch housing or some convenient portion of the vehicle, and the corresponding end of the core 63 is secured to the end of the lever 26 or to the pin 64. The bracket 61 is so positioned and is of such shape and dimensions that the point of attachment of the core 63 to the lever 26 or pin 64 lies directly above the portion of the bracket 61 in which the end of the casing of the Bowden cable is secured. At the other end of the Bowden cable 60 the end of the casing is secured in a bracket 65 attached to the transmission casing and so arranged that the portion in which the cable is secured lies directly below the free end of the lever 48'. An aperture, not shown, is provided in the free end of the lever 48', and the end of the core 63 extends through this aperture to a point somewhat above the top surface of the lever. On the portion of the wire extending above the lever there is secured a stop element 68 which causes the core 63 to pull the lever 48' down, but permits the core to rise freely through the aperture in the lever. A spring 69 is provided to return the lever 26' to its normal position.

From the above description it will be seen that with a mechanism of the character described, the primary shift, which may be the free wheeling shift of a transmission employing the free wheeling principle, may be accomplished without depression of the clutch pedal but that the over-shift which, in such a transmission, would comprise the positive gear shift of the transmission, is effectively prevented unless the clutch pedal is depressed and the engine thereby released from the transmission. By reason of the slot provided in the upper end of the link 52, the clutch pedal is permitted to return to its normal position regardless of whether the member 32 remains tilted or not.

Having described my device and the principal objects and advantages thereof, what I desire to secure by Letters Patent is as follows:

What I claim is:

1. In a vehicle transmission provided with a primary shift and an over-shift, means to prevent over-shift, and clutch actuated means to render said first means ineffective.

2. In a vehicle transmission provided with a primary shift and an over-shift, means to limit the action of said transmission to said primary shift, and clutch actuated means to render said first means ineffective to thereby permit over-shift.

3. In a vehicle transmission provided with a primary shift and an over-shift, a cover for said transmission, a shift lever projecting into said cover, and means projecting into said cover to engage said shift lever to limit its motion to the primary shift, said means being clutch actuated to release said lever to permit over-shift.

4. In combination with a vehicle clutch pedal, and a vehicle transmission provided with a primary shift and an over-shift, means to limit said transmission to the primary shift, said means being operatively connected to said clutch pedal and actuated thereby to permit over-shift upon depression of said clutch pedal.

5. In combination with a vehicle clutch pedal, a vehicle transmission provided with a primary shift and an over-shift, a cover for said transmission and a gear shift lever projecting into said cover, a gear shift control comprising, a stop member within said cover engageable with said gear shift lever, to limit its motion to the primary shift, and means connecting said stop member with said clutch pedal whereby upon depression of said clutch pedal, said stop member is tilted out of engagement with said gear shift lever to permit over-shift.

6. In combination with a vehicle clutch, a vehicle transmission provided with a primary shift and an over-shift, a cover for said transmission, and a gear shift lever projecting into said cover, a gear shift control comprising, a lug on said gear shift lever, a stop member within said cover engageable with said lug to limit the motion of said lever, and means connecting said stop member with said clutch to render said stop member clutch actuated to release said lug.

7. In combination with a vehicle clutch pedal, a vehicle transmission provided with a primary shift and an over-shift, a cover for said transmission and a gear shift lever projecting into said cover, a stop member in said cover engageable with said lever to limit its motion to the primary shift, and link and lever means connecting said stop member with said clutch pedal to render said stop member clutch actuated to release said lever.

8. In combination with a vehicle clutch, a vehicle transmission provided with a primary shift and an over-shift, a cover for said transmission and a gear shift lever projecting into said cover, a stop member in said cover engageable with said lever to limit its motion to the primary shift, and a Bowden wire connection between said stop member and said clutch to render said stop member clutch actuated to release said lever.

9. In combination with a vehicle clutch, a vehicle transmission provided with a primary shift and an over-shift, a cover for said transmission and a gear shift lever projecting into said cover, a stop member in said cover engageable with said lever to limit its motion to the primary shift, means connecting said stop member to said clutch to tilt said stop member upon actuation of said clutch to release said lever, said connecting means including a lost motion connection to permit said clutch to close when said stop member is tilted.

10. In combination with a vehicle clutch pedal, and a vehicle transmission provided with a primary shift and an over-shift, shift control means associated with said transmission and actuated by said clutch pedal to automatically provide for over-shift of said transmission whenever said clutch pedal is depressed.

JOHN H. SAMPSON.